Figure 11:
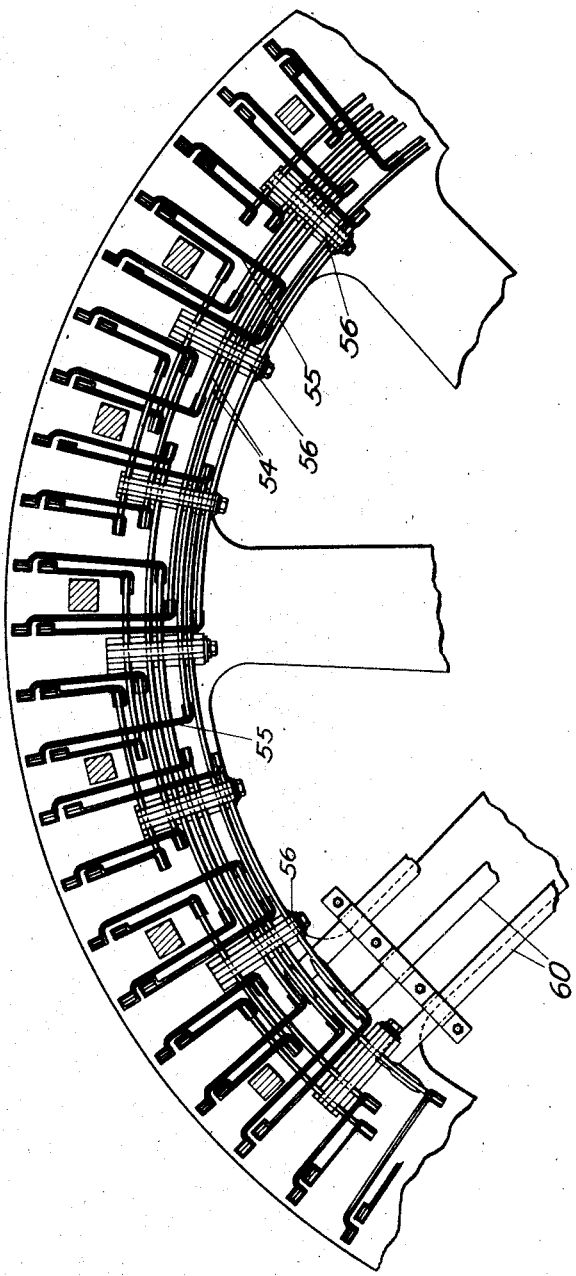

H. L. BARNHOLDT.
WINDING STRUCTURE FOR MULTISPEED INDUCTION MOTORS.
APPLICATION FILED MAY 2, 1917.
1,387,458.
Patented Aug. 16, 1921.
4 SHEETS—SHEET 1.
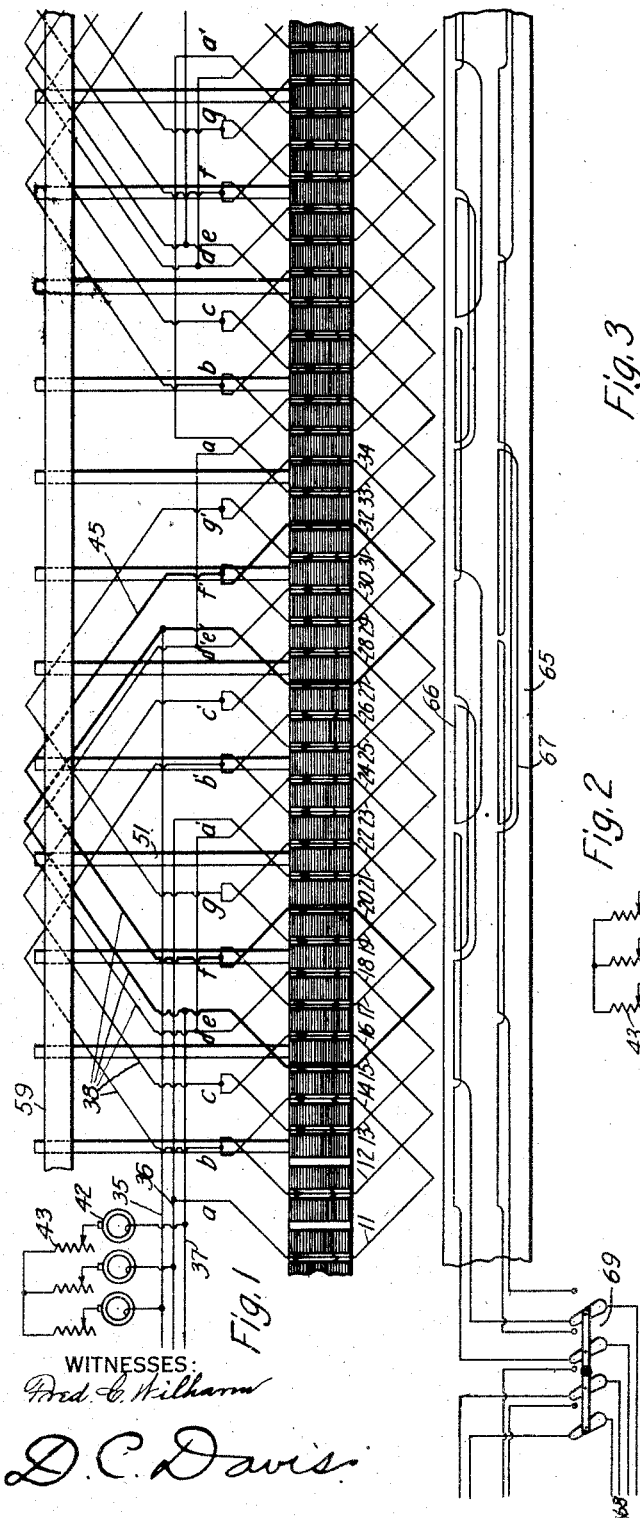
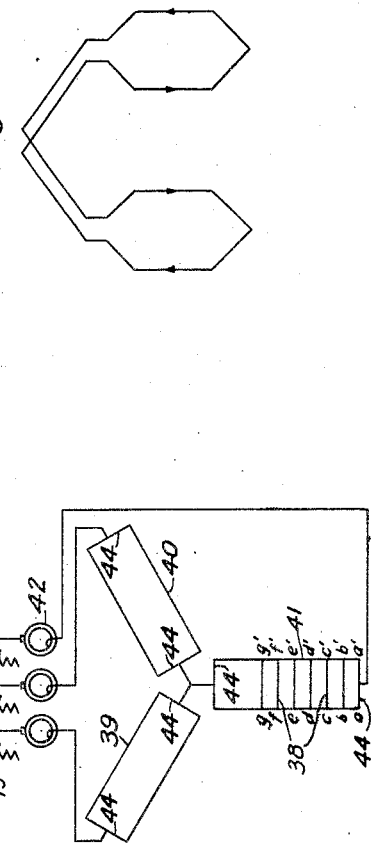
WITNESSES:
Fred C. Williams
D. C. Davis
INVENTOR
Harold L. Barnholdt
BY
Wesley G. Carr
ATTORNEY

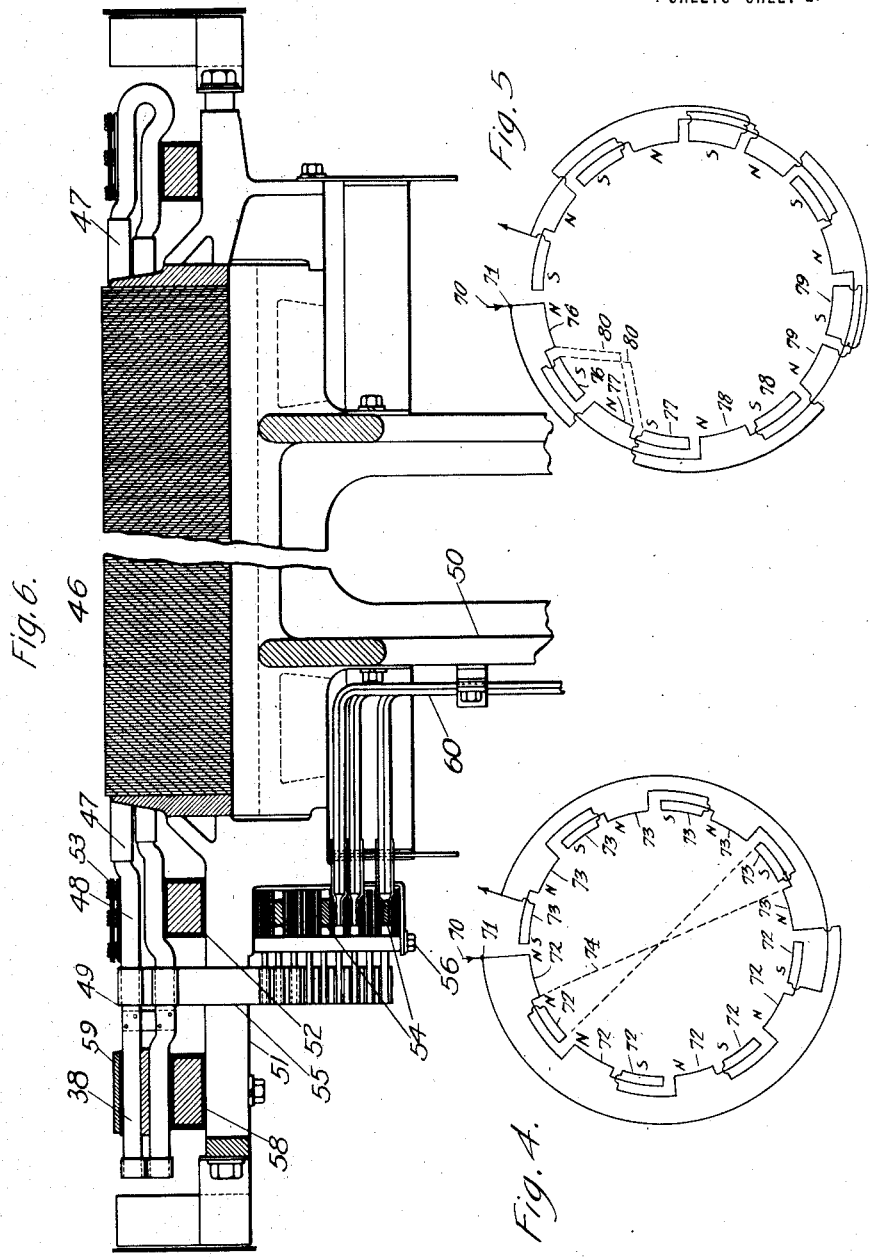

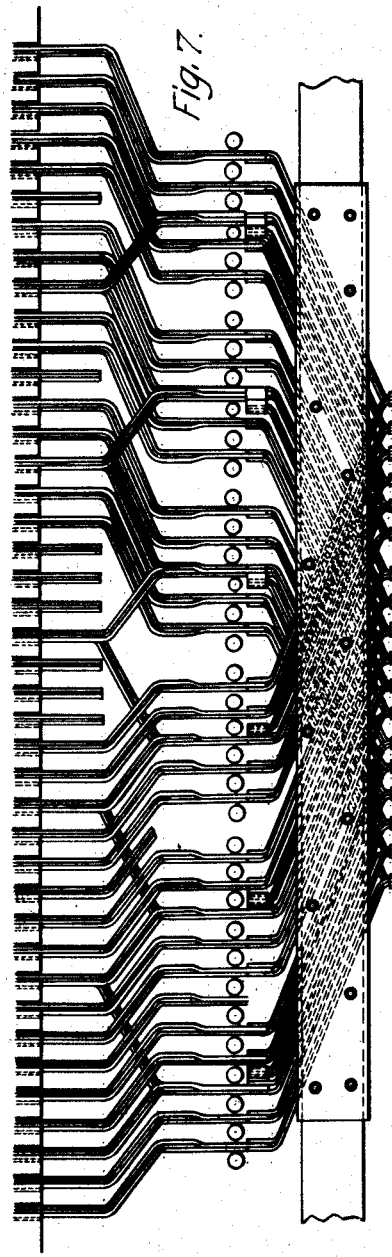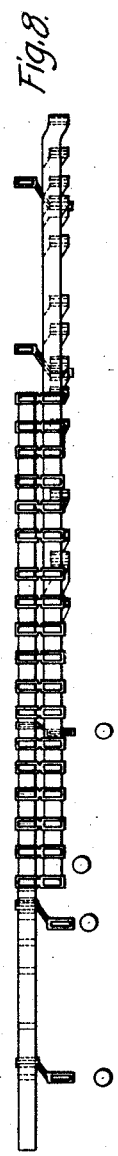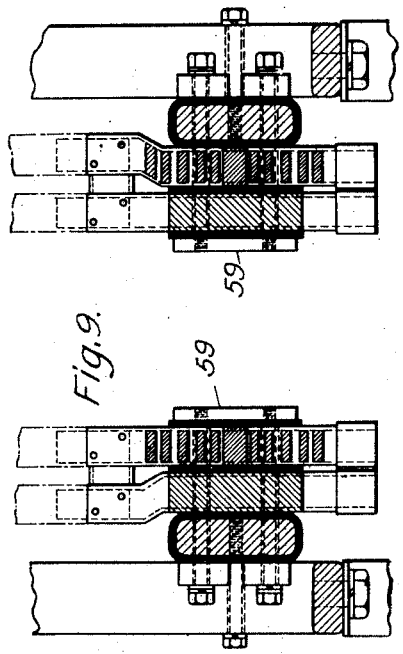

H. L. BARNHOLDT.
WINDING STRUCTURE FOR MULTISPEED INDUCTION MOTORS.
APPLICATION FILED MAY 2, 1917.

1,387,458.

Patented Aug. 16, 1921.
4 SHEETS—SHEET 4.

WITNESSES:
Fred C. Wilharm
D. C. Davis.

INVENTOR
Harold L. Barnholdt
BY
Wesley G. Carr
ATTORNEY

UNITED STATES PATENT OFFICE.

HAROLD L. BARNHOLDT, OF PITTSBURGH, PENNSYLVANIA, ASSIGNOR TO WESTINGHOUSE ELECTRIC AND MANUFACTURING COMPANY, A CORPORATION OF PENNSYLVANIA.

WINDING STRUCTURE FOR MULTISPEED INDUCTION-MOTORS.

1,387,458.     Specification of Letters Patent.    Patented Aug. 16, 1921.

Application filed May 2, 1917. Serial No. 165,843.

*To all whom it may concern:*

Be it known that I, HAROLD L. BARNHOLDT, a citizen of the United States, and a resident of Pittsburgh, in the county of Allegheny and State of Pennsylvania, have invented a new and useful Improvement in Winding Structures for Multispeed Induction-Motors, of which the following is a specification.

My invention relates to a primary winding structure for induction motors and to a supporting structure therefor, and it has for its object to provide a multi-speed induction motor of compact, symmetrical and inexpensive construction.

More specifically, my invention provides an arrangement of the winding elements of a multiple-circuit secondary winding in an induction motor whereby equi-potential points in the several winding circuits shall be relatively close to each other, and short equi-potential connectors may be disposed between said equi-potential points.

My invention further provides a specific supporting structure whereby said equi-potential connectors may be simply and rigidly mounted to form a symmetrical and compact winding structure.

In the accompanying drawing, Figure 1 is a developed view of a portion of the secondary winding of an induction motor, together with certain external secondary connections and a diagrammatic showing of a stator having windings for producing poles of different pitches, indicating the direction of current flow in the different secondary conductors under these operating conditions; Fig. 2 is a diagram of the complete secondary connections of the motor indicated in Fig. 1; Fig. 3 is a diagram of the short-circuited path provided through the secondary winding when operating with one number of poles indicated in Fig. 1; Fig. 4 is a diagrammatic view of the usual secondary pole arrangement of an induction motor; Fig. 5 is a diagrammatic view of the secondary pole arrangement in an induction motor embodying my invention; Fig. 6 is a fragmentary longitudinal sectional view of the rotor of an induction motor embodying my invention; Fig. 7 is a developed plan view of a portion of the secondary winding further illustrating my invention; Fig. 8 is an end view of the structure shown in Fig. 5; Figs. 9 and 10 are detail views of the special conductor-supporting structure; and Fig. 11 is an end view, in elevation, of the rotor of an induction motor, as employed in the complete practice of my invention.

It has been proposed to control the speed of induction motors by changing the number of poles produced by the primary winding and by so arranging the secondary winding that certain cross connectors associated therewith connect points of substantially equal potentials, with one number of primary poles and points of substantially opposite polarity, with another number of poles. By a suitable location of resistors with respect to said cross-connectors, it is possible to obtain a radically different secondary resistance with one number of poles than with another number of poles, thus permitting starting with high torque and subsequent running at high efficiency. A structure of this general character is shown and described in U. S. Patent 821,044, issued to the Westinghouse Electric & Manufacturing Company on May 22, 1906, upon an application filed by B. G. Lamme.

In order to obtain the method of speed control just described, it is necessary to employ two or more multiple circuits for each phase of the secondary winding, as it is obvious that the equi-potential points may be secured only in multiple paths. The arrangement of said multiple paths which has hitherto been employed has been to dispose all of the field poles which are produced by one circuit in adjacent relation so that, for example, in a secondary-winding structure employing two parallel circuits, the field poles of one phase through an arc of 180° were energized from one winding circuit and through the remainder of the circumference of the secondary structure from the other winding circuit. This structure is illustrated in Fig. 4, wherein only a single-phase winding is shown. The lead 70 is split at the point 71 and one branch thereof supplies the field poles 72—72 while the remaining branch supplies the field poles 73—73. This arrangement of winding has its advantages, in that a majority of the field poles are connected to the immediately adjacent field poles but, nevertheless, it is difficult of application when, for any reason, it is desired to employ equi-potential connectors, as the equi-potential points are obviously diametrically opposite to each other, as indicated by the connectors 74 and 75 in Fig. 4. With induction motors of large size and capacity, this necessitates the use of extremely long and heavy connectors.

In accordance with the present invention, I arrange the secondary winding of an induction motor as indicated in Fig. 5. A lead 70 is split at the point 71 and one branch thereof supplies the poles 76—76 and then skips to the poles 78—78. The other branch of the lead 70 energizes the poles 77—77, intermediate between the poles 76 and 78, and then skips to the poles 79—79. Thus, the pole pairs of the two winding circuits alternate with each other around the entire circumference and it is necessary for equi-potential connectors to span only a single pole pair, as indicated at 80—80. Thus, in a large induction motor, the equi-potential connectors may be greatly reduced in size and weight, producing a resultant winding structure which is relatively compact.

In the further practice of the present invention, I employ a motor of the general character described in the aforementioned Lamme patent, the necessary control resistors being mounted external to the secondary rotor member and being conductively connected thereto by means of suitable slip rings. A portion of the function of the above-noted cross-connectors is performed by the usual arc-shaped cross-connectors employed for current equalization in a multipolar motor and preferably mounted upon the end of the rotor member. The total number of cross connectors necessary for the full practice of my invention is such, however, that they may not all be disposed in this manner and I, therefore, provide a plurality of special V-shaped cross connectors. The terminals of said connectors are attached to the coil ends of the secondary winding at appropriate points and said connectors are disposed to form a cylindrical layer extending longitudinally away from the core member. A suitable supporting structure is built out from the end of the core member and said special V-spaced connectors are firmly attached thereto. In this manner I am enabled to provide a winding structure which is neat an economical in assembly and extremely well ventilated in operation, all as is necessary for large induction motors such as are employed in heavy-duty service.

Referring to the drawings for a more detailed understanding of my invention, I show, in Fig. 1, a plurality of secondary conductors which are numbered 11 to 34, inclusive. A stator member 65 is shown in development adjacent to the rotor member and is provided with two distinct two-phase windings 66 and 67, a single pole of the winding 65 subtending four slots of the rotor, whereas a single pole of the winding 67 subtends six rotor slots. The windings 66 and 67 may be energized from a suitable two-phase source through the leads 68, the energization being transferred from one winding to the other by means of a suitable switch 69. By this radical change in the primary pole-number, two distinct motor speeds may be secured, as is well known in the art. With the number of poles produced by the winding 67, the pole span being sufficient to embrace six of the conductors, the direction of current flow in the secondary conductor is as indicated by the light arrow heads. The cross-connectors ordinarily employed for current equalization in a multipolar machine are shown at 35, 36 and 37 and connect points which are of equal potential, with the number of poles produced by the winding 67. A plurality of special V-shaped end connectors 38—38 are provided to connect the ends of spaced turns in the rotor winding which are at equal potential with the specific number of poles assumed.

Under the above described conditions, the entire secondary circuit is as indicated in Fig. 2. The rotor winding is three-phase in nature and each of the three phases 39, 40 and 41 comprises two conducting paths in parallel. Said phase windings are connected in star, and their outer terminals are connected, through suitable slip rings 42, to an external control resistor 43. The cross connectors 35, 36 and 37 provide the connections between the parallel conducting paths of the different phases indicated at 44—44. The special end connectors 38—38, connecting points of equal potential, are indicated at 38—38. With the specific number of poles and the pole pitch produced by the winding 67, therefore, the cross connectors 38—38 carry no current whatsoever, and a polyphase electromotive force is applied to the slip rings 42 for supply to the external resistor 43.

When the number of poles and the pole pitch of the primary member are changed to the value produced by the winding 66, it will be noted that the cross connectors 38—38 connect points of opposite polarity in the winding so that a plurality of closed circuits are formed, one of said closed circuits being shown in heavy lines at 45, for clearness, and being shown separately in Fig. 3

Having thus described the electrical features of a machine involving my invention, the mechanical construction is as follows: Referring to Fig. 6, the laminated core of the rotor member is shown at 46 and the secondary winding projects therefrom, as shown at 47 and 48. Said winding is preferably composed of the usual diamond shaped coils, said coils terminating at one end, at the point 49. The laminated core member 46 is carried by a spider 50, and longitudinal arms 51 project from the end of said spider. The coil ends 48 are suitably supported and insulated from the arms 51 by a suitable spacing block 52 and are held firmly thereagainst by the usual banding 53. The usual cross-connectors, shown at 35, 36 and 37 in Fig. 1, are formed by arc-shaped conductors 54, shown in section in Fig. 6 and in elevation in Fig. 11 and by radially extending conductors 55, shown in elevation in Fig. 6 and in edge view in Fig. 11. The arc-shaped connectors 54—54 are firmly mounted against the end of the spider 50 by any suitable means, such as bolt clamps 56.

The special V-shaped connectors, indicated at 38—38 in Fig. 1, are shown at 38 in Fig. 6, having their terminals connected to the vertices of the appropriate coil ends at the point 49 and extending longitudinally away from the core member 46. The arms 51 extend out as far as do said connectors 38 and carry a suitable insulating and spacing block or ring 58 against which the connectors 38 are firmly held by an encompassing band 59, bolted through at frequent intervals to the ring 58 as indicated in detail in Figs. 9 and 10. The ring 58, in turn, is firmly bolted to the arms 51, as further indicated in Figs. 9 and 10.

The distribution of potentials in the secondary winding is such that, if the special V shaped connectors, indicated at 38 in Figs. 1 and 6, are properly connected, they may be smoothly nested together, as shown in Fig. 7. All of said connectors are of substantially the same pitch, and, therefore, irregularities and unevenness in the arrangement of said cross connectors may be almost entirely avoided.

The connectors from the windings to the slip rings 42 are shown at 60 in Figs. 6 and 11, said connectors being firmly attached to one of the arms of the spider 50 and extending down the shaft for attachment to the slip rings.

While I have shown my invention in its preferred forms, it will be obvious to those skilled in the art that it is susceptible of various minor changes and modifications without departing from the spirit thereof and I desire, therefore, that only such limitations shall be placed thereupon as are imposed by the prior art or as are indicated in the appended claims.

I claim as my invention:

1. In an induction motor, a phase-winding embodying a plurality of current paths, each path including a plurality of pairs of pole-groups of mutually opposite polarity, the pole-pairs of one circuit being interspersed between the pole-pairs of another circuit, the pole-groups being so arranged that the north pole of one group is adjacent the south pole of the next adjacent group.

2. In a polyphase induction motor, a multiple-circuit winding for each phase, each circuit being arranged to produce a plurality of pole pairs and the pole pairs produced by one circuit being interspersed between the pole pairs produced by another circuit, the pole-groups being so arranged that the north pole of one group is adjacent the south pole of the next adjacent group.

3. In a polyphase induction motor, a double-circuit winding for each phase, each circuit being arranged to produce a plurality of pole pairs and the pole pairs of one circuit alternating with the pole pairs of the other circuit, the pole-groups being so arranged that the north pole of one group is adjacent the south pole of the next adjacent group 4. In a polyphase induction motor, a double-circuit winding for each phase, each circuit being arranged to produce a plurality of pole pairs, the pole pairs of one circuit alternating with the pole pairs of the other circuit, and connections between certain equi-potential points in adjacent pole pairs, the pole-groups being so arranged that the north pole of one group is adjacent the south pole of the next adjacent group.

5. In a polyphase induction motor, a double-circuit winding for each phase, each circuit being arranged to produce a plurality of pole pairs, the pole pairs of one circuit alternating with the pole pairs of the other circuit, and connections between certain equi-potential points in pole pairs which are other than diametrically opposite, the pole-groups being so arranged that the north pole of one group is adjacent the south pole of the next adjacent group.

6. In a dynamo-electric machine, the combination with a cylindrical rotor core member provided with slots in its surface, of a winding disposed in said slots and having coils ends protruding from the ends thereof, conducting members connecting points in the end portions of spaced turns of said winding, said conducting members being disposed to form a cylindrical layer substantially coaxial with said core member, arms extending longitudinally from the ends of said core member, a ring member carried by said arms and disposed under said conducting members, and fastening means for attaching said conducting members to said ring member.

7. In a dynamo-electric machine, the combination with a cylindrical rotor core member provided with slots in its surface, of a winding disposed in said slots and having coil ends protruding from the ends thereof, V-shaped cross-connectors interconnecting spaced core ends of said winding and disposed to form a cylindrical layer substantial coaxial with, and of substantially the same diameter as, said core members, and additional cross-connectors interconnecting spaced coil ends, said connectors being formed of end portions connected to the respective coil ends and extending radially inward, and arc-shaped portions connecting the respective radial end portions.

8. In a dynamo-electric machine, the combination with a cylindrical rotor core member provided with slots in its surface, of a winding disposed in said slots and having coil ends protruding from the ends thereof, a supporting structure extending longitudinally from the end of said core member and providing a supporting surface in proximity to the vertices of said V-shaped cross-connectors, fastening means for attaching said cross-connectors to said supporting structure, and additional cross-connectors interconnecting spaced coil ends, said connectors being formed of end portions connected to the respective coil end and projecting radially inward through said supporting structure for the V-shaped cross-connectors and arc-shaped portions connecting the respective radial end portions and attached to the end of said core member.

In testimony whereof, I have hereunto subscribed my name this 28th day of April, 1917.

HAROLD L. BARNHOLDT.